UNITED STATES PATENT OFFICE.

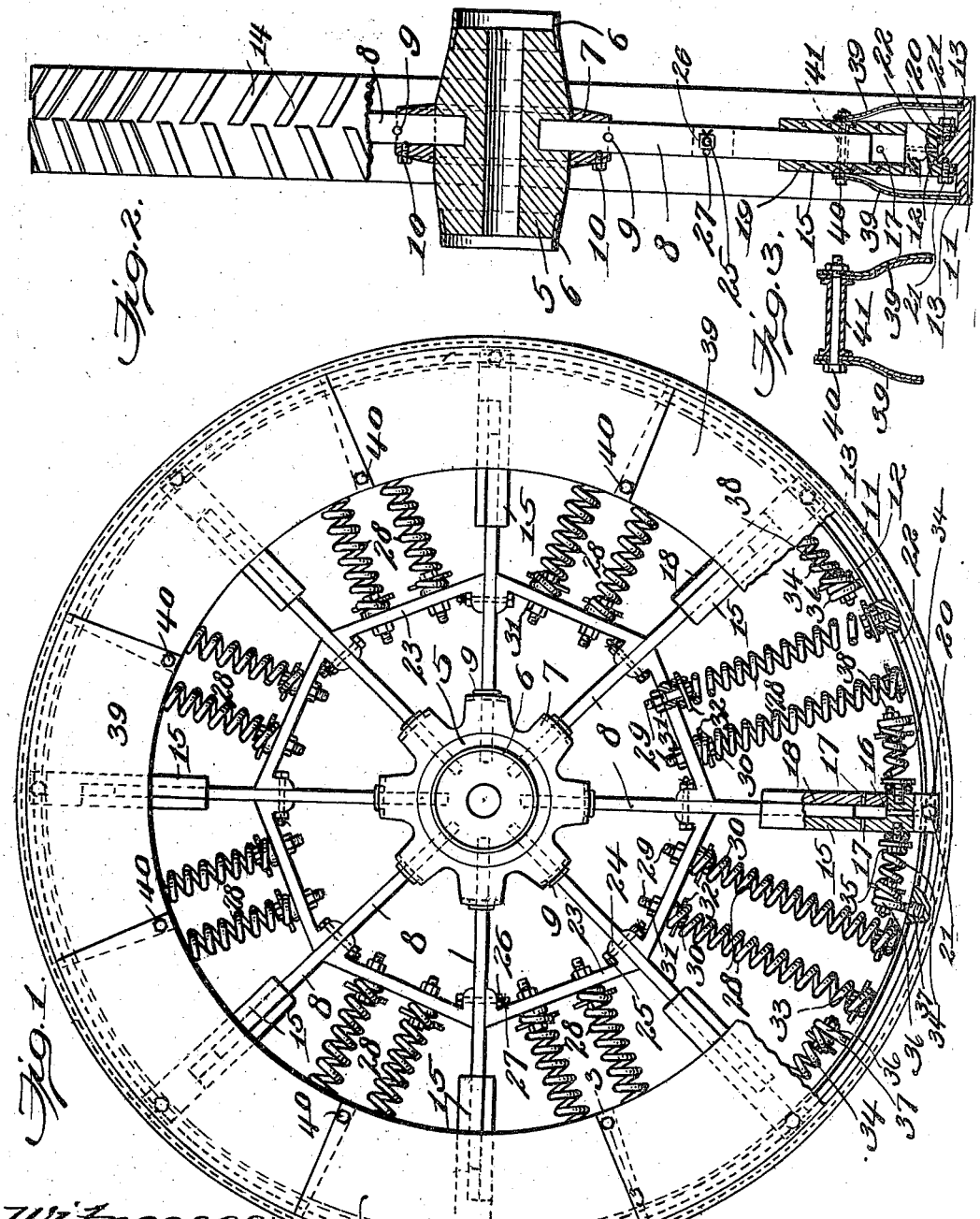

EDWIN G. OWEN, OF WYSOX, PENNSYLVANIA.

SPRING-WHEEL.

1,009,169.   Specification of Letters Patent.   Patented Nov. 21, 1911.

Application filed March 21, 1911. Serial No. 615,888.

*To all whom it may concern:*

Be it known that I, EDWIN G. OWEN, a citizen of the United States, residing at Wysox, in the county of Bradford and State of Pennsylvania, have invented certain new and useful Improvements in Spring-Wheels, of which the following is a specification.

This invention relates to spring wheels of that class having a rim which is radially movable relatively to the hub, with springs interposed between the rim and hub to oppose the relative movement thereof, thereby taking up shocks received by the rim when the wheel is passing over rough roads or obstructions.

It is the object of the present invention to provide a strong and durable wheel of the kind stated, and also one which is simple in construction so that it can be cheaply made, and, furthermore, to provide a novel and improved arrangement of springs, and other structural details to be hereinafter described and claimed.

In order that the invention may be better understood, reference is had to the accompanying drawing forming a part of this specification, in which drawing—

Figure 1 is an elevation of the wheel with parts broken away. Fig. 2 is an edge view of the wheel partly in section. Fig. 3 is a sectional detail on the line 3—3 of Fig. 1.

Referring specifically to the drawing, 5 denotes the hub of the wheel, said hub having fitted to its ends metal bands 6 projecting out over said ends, and shrunk on. On the hub, midway between its ends, is also shrunk a metallic ring 7 having mortises for the spokes 8 of the wheel. The mortises in the ring are continued into the hub. The spokes are fastened in the mortises by pins 9 passing transversely through the spokes, and having their projecting ends seated in grooves made in the ring, said pins thus forming shoulders which limit the inward movement of the spokes. The spokes are further secured by set screws 10 threaded through one side of the ring and screwed against the spokes.

The rim 11 of the wheel has a central rib 12 on its inner periphery and on opposite sides of said rib, close to the edges of the rim, are grooves 13, said rib and grooves being continuous. The outer periphery of the rim is flat in cast flat rubber tires are to be used; otherwise the rim is formed with oblique traction ribs 14 alternating from the center line.

The outer ends of the spokes pass into sleeves 15 connected to the rim in a manner to be presently described. The bore of the sleeve is sufficiently large to allow the spoke to work easily therein, and at the bottom of the bore is an oil duct 16 which extends to the top of the rib 12. The sleeve also has air holes 17 on opposite sides, to permit the entry and escape of air as the spoke slides back and forth in the bore of the sleeve. One side of the sleeve has a removable portion 18, which is held in place by screws or other suitable fastening means 19. The end of the sleeve which is next to the rim rides on the rib 12, and has ears 20 between which said rib is received. The sleeve is kept from slipping radially by set screws 21 which are threaded through the ears 20, the points of said screws seating in grooves 22 in opposite sides of the rib 12. The set screws are left sufficiently loose so as to permit the sleeve to slide back and forth on the rib.

The spokes 8 are connected adjacent to their inner ends by braces 23. These braces are bent up at their ends to form flanges 24, said flanges extending at such an angle to the braces as to fit the spokes. The braces are secured to the spokes by bolts 25 passing through the latter and through the flanges 24. The nuts 26 whereby the bolts 25 are secured are locked by cotter pins 27. The braces are located between every two spokes.

At 28 are indicated the main springs for cushioning the relative movement of the hub and rim of the wheel. Two of these springs are located radially between every two spokes, and the braces 23 serve as abutments for one end of said springs. The ends of the springs which engage the braces are made fast by bolts 29 passing through the braces, the head 30 of the bolt being located within the coil, and the bolt being secured by a nut 31 screwed against the braces. The bolt also passes through an oval shaped washer 32 which is creased to fit the first coil of the spring. The connection between the springs 28 and the rim is made by tap bolts 33 in the same manner as the other ends of the springs, the tap bolts being screwed into the rib 12. Supplementary springs 34 are also provided, one of these springs being located on each side of the sleeve 15 adjacent to its point of connection to the rim 11. One end of each supplementary spring is fastened to the sleeve by a tap bolt 35, and the other end of said spring abuts against the head 36 of a thumb screw 37 threaded into the rib 12, this end of the spring being secured by a bolt 38 passing through said head of the thumb screw. Washers similar to the ones 32 already described are also provided for the fastenings of the supplementary springs. The wheel is also provided on each side with a mud guard extending inwardly from the rim so as to entirely cover the supplementary springs and partly cover the main springs. The mud guards comprise segmental plates 39 which are cut to fit in the grooves 13, and they are long enough to overlap at their ends. These plates stand at a right angle to the rim for a short distance, and then gradually bend inwardly to within a short distance of the sleeves 15, the inner edges of the plates being then bent again at a right angle to the rim. The overlapping ends of the plates of the respective sides of the wheel are connected by bolts 40 which pass through a separator sleeve 41 located between the plates.

By the structure herein described a strong and durable spring wheel is had, and as it is without complicated parts, it can be cheaply manufactured. The arrangement of the springs gives the wheel sufficient resiliency so that it may be successfully substituted for a pneumatic tire wheel.

I claim:

A wheel comprising a hub, a rim having a rib on its inner periphery, said rib being grooved on opposite sides, spokes, supporting members for the outer ends of the spokes, said spokes having a sliding connection with the supporting members, and the latter having ears between which the rib of the rim extends, set screws threaded through the ears and extending at their inner ends into the grooves of the rib, springs abutting at one of their ends against the supporting member, an abutment for the other ends of said springs carried by the rim, abutments carried by the spokes, and springs interposed between said abutments and the rim.

In testimony whereof I affix my signature in presence of two witnesses.

EDWIN G. OWEN.

Witnesses:
SUSAN A. OWEN,
GEO. W. BURTIN.